United States Patent
Subbarao et al.

(10) Patent No.: US 7,412,563 B2
(45) Date of Patent: *Aug. 12, 2008

(54) METHOD AND SYSTEM FOR CALCULATING SINGLE AND DUAL PARITY FOR NETWORKED STORAGED ELEMENTS

(75) Inventors: Sanjay Subbarao, Irvine, CA (US); Kenneth W. Brinkerhoff, Mission Viejo, CA (US)

(73) Assignee: Aristos Logic Corporation, Foothill Ranch, CA (US)

(*) Notice: Subject to any disclaimer, the term of this patent is extended or adjusted under 35 U.S.C. 154(b) by 370 days.

This patent is subject to a terminal disclaimer.

(21) Appl. No.: 11/196,409

(22) Filed: Aug. 4, 2005

(65) Prior Publication Data
US 2006/0031712 A1 Feb. 9, 2006

Related U.S. Application Data

(60) Provisional application No. 60/598,439, filed on Aug. 4, 2004.

(51) Int. Cl.
*G06F 12/06* (2006.01)
(52) U.S. Cl. .................................... 711/114
(58) Field of Classification Search ................ 711/114
See application file for complete search history.

(56) References Cited

U.S. PATENT DOCUMENTS

| 6,453,428 | B1 | 9/2002 | Stephenson |
| 6,675,318 | B1 | 1/2004 | Lee |
| 6,694,479 | B1 | 2/2004 | Murthy et al. |
| 2003/0126522 | A1 | 7/2003 | English et al. |
| 2003/0126523 | A1 | 7/2003 | Corbett et al. |
| 2006/0129760 | A1* | 6/2006 | Subbarao ............... 711/114 |

* cited by examiner

*Primary Examiner*—Hyung Sough
*Assistant Examiner*—Shawn Eland
(74) *Attorney, Agent, or Firm*—Dickstein Shapiro LLP (57) ABSTRACT

A method of calculating single and dual parity for a networked array of storage elements is presented. The method includes deriving a first set of n relationships where each of the first set of n relationships consists of an XOR statement equaling zero. Each of the first set of n relationships contains n data symbols from n storage elements and one parity symbol from a first set of parity symbols. The method also includes deriving a second set of n+1 relationships where each of the second set of n+1 relationships consists of an XOR statement equaling zero, containing at least n−1 data symbols from at least n−1 storage elements and one parity symbol from a second set of parity symbols. Using both the first and second sets of derived relationships, scripts are generated to resolve unresolved symbols resulting from possible single- and dual-storage element failure combinations.

32 Claims, 3 Drawing Sheets

METHOD AND SYSTEM FOR CALCULATING SINGLE AND DUAL PARITY FOR NETWORKED STORAGED ELEMENTS

CROSS-REFERENCE TO RELATED APPLICATIONS

This patent application claims priority to U.S. Provisional Application No. 60/598,439 filed on Aug. 4, 2004 in the U.S. Patent and Trademark Office, the entire content of which is incorporated by reference herein.

FIELD OF THE INVENTION

The present invention relates to a method that calculates single and dual parity in a networked storage system and specifically relates to an algorithm that compensates for dual-drive failures in a networked storage system.

BACKGROUND OF THE INVENTION

With the accelerating growth of Internet and intranet communication, high-bandwidth applications (such as streaming video), and large information databases, the need for networked storage systems has increased dramatically. System performance, data protection, and cost have been some of the main concerns in designing networked storage systems. In the past, many systems have used fibre channel drives, because of their speed and reliability. However, fibre channel drives are very costly. Integrated drive electronics (IDE) drives are much cheaper in terms of dollars-per-gigabyte of storage; however, their reliability is inferior to that of fibre channel drives. Furthermore, IDE drives require cumbersome 40-pin cable connections and are not easily replaceable when a drive fails. Serial advanced technology attachment (SATA) drives that use the same receptor as their fibre channel counterparts are now available. These drives, therefore, have the speed required for acceptable system performance and are hot-swappable, which means that failed SATA drives are easily replaced with new ones. Furthermore, they provide more storage than do fibre channel drives and at a much lower cost. However, SATA drives still do not offer the same reliability as fibre channel drives. Thus, there is an industry push to develop high-capacity storage devices that are low cost and extremely reliable.

To improve data reliability, many computer systems implement a redundant array of independent disks (RAID) system, which is a disk system that includes a collection of multiple disk drives that are organized into a disk array and managed by a common array controller. The array controller presents the array to the user as one or more virtual disks. Disk arrays are the framework to which RAID functionality is added in functional levels in order to produce cost-effective, highly available, high-performance disk systems.

In RAID systems, the data is distributed over multiple disk drives to allow parallel operation, and thereby enhance disk access performance and provide fault tolerance against drive failures. Currently, a variety of RAID levels from RAID level 0 through RAID level 6 have been specified in the industry. RAID levels 1 through 5 provide a single-drive fault tolerance. That is, these RAID levels allow reconstruction of the original data if any one of the disk drives fails. It is quite possible, however, that more than one SATA drive may fail in a RAID system. For example, dual-drive failures are becoming more common as RAID systems incorporate an increasing number of less expensive disk drives.

To provide, in part, a dual-fault tolerance to such failures, the industry has specified a RAID level 6. The RAID 6 architecture is similar to RAID 5, but RAID 6 can overcome the failure of any two disk drives by using an additional parity block for each row (for a storage loss of 2/N, where N represents the number of networked drives). The first parity block (P) is calculated by the performance of an exclusive or (XOR) operation on a set of positionally assigned data sectors (i.e., rows of data sectors). Likewise, the second parity block (Q) is generated by the use of the XOR function on a set of positionally assigned data sectors (i.e., columns of data sectors). When a pair of disk drives fails, the conventional dual-fault tolerant RAID systems reconstruct the data of the failed drives by using the parity sets. RAID systems are well known in the art and are amply described, for example, in *The RAID-book, 6th Edition: A Storage System Technology Handbook*, edited by Paul Massiglia (1997), which is incorporated herein by reference.

An examplary dual-parity algorithm is found in U.S. Pat. No. 6,453,428, entitled, "Dual-drive Fault Tolerant Method and System for Assigning Data Chunks to Column Parity Sets." The '428 patent describes a method and system for assigning data chunks to column parity sets in a dual-drive fault tolerant storage disk drive system that has N disk drives, where N is a prime number. Each of the N disk drives is organized into N chunks, such that the N disk drives are configured as one or more N×N array of chunks. The array has chunks arranged in N rows from row 1 to row N and in N columns from column 1 to column N. Each row includes a plurality of data chunks for storing data, a column parity chunk for storing a column parity set, and a row parity chunk for storing a row parity set. These data chunks are assigned in a predetermined order. The data chunks in each row are assigned to the row parity set. Each column parity set is associated with a set of data chunks in the array, wherein row m is associated with column parity set $Q_m$, where m is an integer that ranges from 1 to N. For row 1 of a selected N×N array, a first data chunk is assigned to a column parity set $Q_i$, wherein i is an integer determined by rounding down (N/2). For each of the remaining data chunks in row 1, each data chunk is assigned to a column parity set $Q_j$, wherein j is an integer one less than the column parity set for the preceding data chunk and wherein j wraps to N when j is equal to 0. For each of the remaining rows 2 to N of the selected array, a first logical data chunk is assigned to a column parity set $Q_k$, wherein k is one greater than the column parity set for the first logical data chunk in a preceding row and wherein k wraps to 1 when k is equal to (N+1). For each of the remaining data chunks in rows 2 to N, each data chunk is assigned to a column parity set $Q_n$, wherein n is an integer one less than a column parity set for the preceding data chunk and wherein n wraps to N when n is equal to 0.

The algorithm described in the '428 patent safeguards against the loss of data in the event of a dual-drive failure. However, performance of the algorithm described uses excess XOR processing cycles, known as XOR bandwidth that may otherwise be utilized for performing system storage tasks. Hence, the '428 patent describes a suitable dual-parity algorithm for calculating dual-parity and for restoring data from a dual-drive failure, yet it fails to provide an optimized software system that is capable of performing the dual-parity algorithm without affecting system performance.

Furthermore, the algorithm described in the '428 patent is dependent on row and column parity, which requires a prime number of data drives to be present in the system. The requirement of a specific number of drives limits system design flexibility, which can lead to increased cost (e.g., a system that requires fourteen drives to meet storage needs would need seventeen drives, the next prime number of drives, in order to meet parity algorithm requirements). In some cases, phantom drives are used to fill in the missing number of drives in order to achieve a prime number of drives. These phantom drives are assumed to contain data equal to logical '0' and are used during XOR calculations to create parity or restore lost data. This method uses excess system overhead and processing cycles on the phantom data, which lowers overall system performance.

There is, therefore, a need for an effective means of calculating parity, such that the storage system is fault tolerant against a dual-drive failure, provides optimal system performance by optimizing XOR bandwidth, is capable of generating parity regardless of symbol position (i.e., not dependent on row, diagonal/column parity), and is not dependant on a prime number of drives, phantom drives, or phantom data.

In short, there is a need for an algorithm that compensates for dual-storage element failures in a networked storage system. There is a need for a dual parity calculating algorithm that is not dependent on symbol position, a prime number of drives, phantom drives, or phantom data. And, there is a need for a dual parity calculating algorithm that either runs once a priori or that may be used in real time, without adversely affecting system performance.

BRIEF SUMMARY OF THE INVENTION

A method of calculating single and dual parity for a networked array of storage elements is presented. The method includes deriving a first set of n relationships where each of the first set of n relationships consists of an XOR statement equaling zero. Each of the first set of n relationships contains n data symbols from n storage elements and one parity symbol from a first set of parity symbols. The method also includes deriving a second set of n+1 relationships where each of the second set of n+1 relationships consists of an XOR statement equaling zero, containing at least n−1 data symbols from at least n−1 storage elements and one parity symbol from a second set of parity symbols. Using both the first and second sets of derived relationships, scripts are generated to resolve unresolved symbols resulting from possible single- and dual-storage element failure combinations.

A system is also presented that calculates single and dual parity for a networked array of storage elements. The system includes a set of n networked data storage elements, each of the n data storage elements partitioned into n partitions, each partition configured to store a symbol. The system also includes a first parity storage element partitioned into n partitions and networked with the set of n data storage elements, each partition configured to store a symbol. A second parity storage element is partitioned into n+1 partitions and networked with the set of n data storage elements and the first parity storage element, each partition configured to store a symbol. The system further includes a storage controller that contains a parity generation and data regeneration module. The module is configured to access and run scripts to resolve unresolved symbols resulting from possible single- and dual-storage element failure combinations. The scripts use a first and a second set of relationships, wherein each of the first set of relationships consists of n data symbols from the n data storage elements and one parity symbol from the first parity storage element. Each of the first set of relationships consist of an XOR statement equaling zero. Each of the second set of relationships consists of at least n−1 data symbols from at least n−1 storage elements and one parity symbol from the second parity storage element. Each of the second set of relationships consists of an XOR statement equaling zero.

These and other aspects of the invention will be more clearly recognized from the following detailed description of the invention which is provided in connection with the accompanying drawings.

DETAILED DESCRIPTION OF THE INVENTION

The present invention is a method of calculating dual parity that compensates for one or two storage element failures in a networked storage system with n number of storage elements, without imposing a requirement to install a prime number of storage elements, use phantom storage elements, or use phantom data. The method enables efficient calculation of updated parity symbols for every write operation and data regeneration with fewer XOR operations than other existing prior art algorithms. Unlike most RAID 6 dual-parity calculation algorithms which use row symbol and column symbol parity (or diagonal symbol parity), the method described in this invention works independent of symbol positions and is, therefore, more versatile.

The method uses n number of symbols for n number of data storage elements, where n is any integer value. Additionally, there is a P storage element that includes n number of symbols, and a Q storage element that includes n+1 number of symbols. For example, in an 8+2 system, there are eight data storage elements plus a P storage element and a Q storage element. In this example, there are also eight symbols per data storage element and per P storage element. There are nine symbols on the Q storage element.

The following table, Table 1, illustrates an example of an 8+2 system with eight data storage elements, each including eight symbols, a P storage element, also including eight symbols, and a Q storage element that includes nine symbols.

The disclosed method of calculating dual parity for a networked storage system assumes that each block of data in a storage element (represented by a column in Table 1) is a group of n symbols. For this example, there are eight data storage elements and, thus, eight symbols per data storage element. A symbol may be an arbitrary number of bytes, a word, a portion of a sector, or a block of sectors.

TABLE 1

Example P relationships, where the P relationships are the seed for a method of calculating dual parity for an 8 + 2 networked storage system.

P Relationships

| | Drives | | | | | | | | | |
|---|---|---|---|---|---|---|---|---|---|---|
| | 0 | 1 | 2 | 3 | 4 | 5 | 6 | 7 | | P |
| 0 | $P_1$ | $P_6$ | $P_2$ | $P_3$ | $P_8$ | $P_6$ | $P_1$ | $P_3$ | 0 | $P_3$ |
| 1 | $P_2$ | $P_3$ | $P_1$ | $P_2$ | $P_3$ | $P_7$ | $P_3$ | $P_1$ | 1 | $P_2$ |
| 2 | $P_3$ | $P_1$ | $P_3$ | $P_5$ | $P_4$ | $P_2$ | $P_4$ | $P_2$ | 2 | $P_1$ |
| 3 | $P_4$ | $P_2$ | $P_6$ | $P_4$ | $P_6$ | $P_1$ | $P_2$ | $P_5$ | 3 | $P_8$ |

TABLE 1-continued

Example P relationships, where the P relationships are the seed
for a method of calculating dual parity for an
8 + 2 networked storage system.
P Relationships

| | Drives | | | | | | | | | |
|---|---|---|---|---|---|---|---|---|---|---|
| | 0 | 1 | 2 | 3 | 4 | 5 | 6 | 7 | | P |
| 4 | $P_5$ | $P_4$ | $P_5$ | $P_1$ | $P_2$ | $P_3$ | $P_5$ | $P_6$ | 4 | $P_7$ |
| 5 | $P_6$ | $P_8$ | $P_4$ | $P_6$ | $P_7$ | $P_5$ | $P_7$ | $P_4$ | 5 | $P_4$ |
| 6 | $P_7$ | $P_5$ | $P_7$ | $P_8$ | $P_1$ | $P_4$ | $P_6$ | $P_7$ | 6 | $P_6$ |
| 7 | $P_8$ | $P_7$ | $P_8$ | $P_7$ | $P_5$ | $P_8$ | $P_8$ | $P_8$ | 7 | $P_5$ |

A relationship is a set of symbols that XOR to logical '0.' Additionally, the number of symbols in each relationship equation is equal to the number of data drives in the networked system plus one. The P relationships are a simple set of relationships between the symbols of storage elements and one symbol from the P parity storage element, where each relationship is $P_n$. Each $P_n$ includes one symbol from each data storage element and one symbol from the P storage element; each non-Q storage element symbol is in one, and only one, $P_n$.

For example, in Table 1, using the symbol "^" to mean XOR, D[d,s] to represent a data storage element symbol where d is the storage element number and s is the symbol number, and P[s] and Q[s] of the P parity and the Q parity storage elements, respectively: $P_1$:0=P[2]^D[0,0]^D[1,2]^D[2,1]^D[3,4]^D[4,6]^D[5,3]^D[6,0]^D[7,1]. This example relationship represents a P relationship, because a symbol from the P storage element is used in the equation, the equation includes n+1 symbols, and there are n $P_n$ relationship equations, which translates to eight P relationships ($P_1$-$P_8$) for this example. In the example in Table 1, the number of terms in the XOR equation for each P relationship is equal to the number of data storage elements in the system plus the P parity symbol, which is nine.

There are no relational requirements, such as horizontal, diagonal, or adjacent positions of symbols, as required by other algorithms. In the example in Table 1, there are eight individual $P_n$ relationships. The number of relationship equations is equal to the number of symbols in a column. For this example, there are eight relationship equations ($P_1$-$P_8$). No two relationships have a symbol in common, and each relationship has one symbol from each data storage element and one symbol from the P parity storage element. Thus, for any one missing non-Q symbol, there is a P relationship that can be used to resolve the missing symbol. The P relationship set is made up of the individual $P_n$ relationships. The P relationship set shown in Table 1 is as follows:

$P_1$: 0=P[2]^D[0,0]^D[1,2]^D[2,1]^D[3,4]^D[4,6]^D[5,3]^D[6,0]^D[7,1]

$P_2$: 0=P[1]^D[0,1]^D[1,3]^D[2,0]^D[3,1]^D[4,4]^D[5,2]^D[6,3]^D[7,2]

$P_3$: 0=P[0]^D[0,2]^D[1,2]^D[2,2]^D[3,0]^D[4,1]^D[5,4]^D[6,1]^D[7,0]

$P_4$: 0=P[5]^D[0,3]^D[1,4]^D[2,5]^D[3,3]^D[4,2]^D[5,6]^D[6,2]^D[7,5]

$P_5$: 0=P[7]^D[0,4]^D[1,6]^D[2,4]^D[3,2]^D[4,7]^D[5,5]^D[6,4]^D[7,3]

$P_6$: 0=P[6]^D[0,5]^D[1,0]^D[2,3]^D[3,5]^D[4,3]^D[5,0]^D[6,6]^D[7,4]

$P_7$: 0=P[4]^D[0,6]^D[1,7]^D[2,6]^D[3,7]^D[4,5]^D[5,1]^D[6,1]^D[7,6]

$P_8$: 0=P[3]^D[0,7]^D[1,5]^D[2,7]^D[3,6]^D[4,0]^D[5,7]^D[6,7]^D[7,7]

The Q relationship set is derived by use of the following first embodiment guidelines. The individual relationships within the Q relationship set are defined as $Q_n$. There are n+1 individual Q relationships. Each $Q_n$ includes a symbol from the Q parity storage element and one symbol from all the data storage elements and P parity storage element except one. Each storage element symbol is in one, and only one, $Q_n$. No two symbols in a $Q_n$ relationship are in a $P_n$ relationship. No two $Q_n$ relationships exclude the same storage element. Table 2 shows an example Q relationship set constrained by the P relationship set shown in Table 1.

TABLE 2

An example 8 + 2 Q relationship set constrained by
the P relationship set shown in Table 1.
Q Relationships

| | drives | | | | | | | | | | |
|---|---|---|---|---|---|---|---|---|---|---|---|
| | 0 | 1 | 2 | 3 | 4 | 5 | 6 | 7 | | P | Q |
| 0 | $Q_1$ | $Q_5$ | $Q_9$ | $Q_9$ | $Q_4$ | $Q_1$ | $Q_4$ | $Q_5$ | 0 | $Q_4$ | $Q_2$ |
| 1 | $Q_2$ | $Q_2$ | $Q_8$ | $Q_8$ | $Q_8$ | $Q_2$ | $Q_6$ | $Q_3$ | 1 | $Q_3$ | $Q_1$ |
| 2 | $Q_3$ | $Q_9$ | $Q_1$ | $Q_2$ | $Q_9$ | $Q_6$ | $Q_7$ | $Q_4$ | 2 | $Q_2$ | $Q_3$ |
| 3 | $Q_4$ | $Q_1$ | $Q_4$ | $Q_1$ | $Q_2$ | $Q_5$ | $Q_5$ | $Q_7$ | 3 | $Q_9$ | $Q_5$ |
| 4 | $Q_5$ | $Q_3$ | $Q_3$ | $Q_7$ | $Q_7$ | $Q_7$ | $Q_8$ | $Q_8$ | 4 | $Q_8$ | $Q_6$ |
| 5 | $Q_6$ | $Q_7$ | $Q_2$ | $Q_3$ | $Q_3$ | $Q_9$ | $Q_1$ | $Q_6$ | 5 | $Q_5$ | $Q_4$ |
| 6 | $Q_7$ | $Q_4$ | $Q_5$ | $Q_5$ | $Q_6$ | $Q_8$ | $Q_9$ | $Q_9$ | 6 | $Q_7$ | $Q_9$ |
| 7 | $Q_8$ | $Q_6$ | $Q_6$ | $Q_4$ | $Q_1$ | $Q_3$ | $Q_2$ | $Q_1$ | 7 | $Q_6$ | $Q_8$ |
| | | | | | | | | | | | $Q_7$ |

The $Q_n$ relationships that make up the Q relationship set are as follows:

$Q_1$: 0=Q[1]^D[0,0]^D[1,3]^D[2,2]^D[3,3]^D[4,7]^D[5,0]^D[6,5]^D[7,7] (skipped P)

$Q_2$: 0=Q[0]^P[2]^D[0,1]^D[1,3]^D[2,5]^D[3,2]^D[4,3]^D[5,1]^D[6,7] (skipped D7)

$Q_3$: 0=Q[2]^P[1]^D[0,2]^D[1,4]^D[2,4]^D[3,5]^D[4,5]^D[5,7]^D[7,1] (skipped D6)

$Q_4$: 0=Q[5]^P[0]^D[0,3]^D[1,6]^D[2,3]^D[3,7]^D[4,0]^D[6,0]^D[7,2] (skipped D5)

$Q_5$: 0=Q[3]^P[5]^D[0,4]^D[1,0]^D[2,6]^D[3,6]^D[5,3]^D[6,3]^D[7,0] (skipped D4)

$Q_6$: 0=Q[4]^P[7]^D[0,5]^D[1,7]^D[2,7]^D[4,6]^D[5,2]^D[6,1]^D[7,5] (skipped D3)

$Q_7$: 0=Q[8]^P[6]^D[0,6]^D[1,5]^D[3,4]^D[4,4]^D[5,4]^D[6,2]^D[7,3] (skipped D2)

$Q_8$: 0=Q[7]^P[4]^D[0,7]^D[2,1]^D[3,1]^D[4,1]^D[5,6]^D[6,4]^D[7,4] (skipped D1)

$Q_9$: 0=Q[6]^P[3]^D[1,2]^D[2,0]^D[3,0]^D[4,2]^D[5,5]^D[6,6]^D[7,6] (skipped D0)

The Q relationship set shown in Table 2 abides by the algorithmic constraints, i.e., no data storage element symbol resides in two different Q relationships, only one data storage element or P parity storage element is missing from each Q relationship, and each non-Q storage element is skipped only once. Additionally, no two symbols in a Q relationship are in the same single P relationship. For example, D[0,0] and D[1,3] may not reside together in a single $P_n$ relationship, as they reside in the same Q relationship, $Q_1$, in this case.

In a second embodiment, the symbol Q[8] may be generated (rather than stored) by the performance of an XOR operation on the symbols Q[0] through Q[7].

In a second embodiment, the symbol Q[8] may be generated (rather than stored) by the performance of an XOR operation on the symbols Q[0] through Q[7]. This is because every data symbol and parity symbol exists in the expressions for Q[0] through Q[8]. For example, looking at the above equations:

$Q[0]=P[2]\wedge D[0,1]\wedge D[1,3]\wedge D[2,5]\wedge D[3,2]\wedge D[4,3]\wedge D[5,1]\wedge D[6,7]$ $Q[1]=D[0,0]\wedge D[1,3]\wedge D[2,2]\wedge D[3,3]\wedge D[4,7]\wedge D[5,0]\wedge D[6,5]\wedge D[7,7]$ $Q[2]=P[1]\wedge D[0,2]\wedge D[1,4]\wedge D[2,4]\wedge D[3,5]\wedge D[4,5]\wedge D[5,7]\wedge D[7,1]$ $Q[3]=P[5]\wedge D[0,4]\wedge D[1,0]\wedge D[2,6]\wedge D[3,6]\wedge D[5,3]\wedge D[6,3]\wedge D[7,0]$ $Q[4]=P[7]\wedge D[0,5]\wedge D[1,7]\wedge D[2,7]\wedge D[4,6]\wedge D[5,2]\wedge D[6,1]\wedge D[7,5]$ $Q[5]=P[0]\wedge D[0,3]\wedge D[1,6]\wedge D[2,3]\wedge D[3,7]\wedge D[4,0]\wedge D[6,0]\wedge D[7,2]$ $Q[6]=P[3]\wedge D[1,2]\wedge D[2,0]\wedge D[3,0]\wedge D[4,2]\wedge D[5,5]\wedge D[6,6]\wedge D[7,6]$ $Q[7]=P[4]\wedge D[0,7]\wedge D[2,1]\wedge D[3,1]\wedge D[4,1]\wedge D[5,6]\wedge D[6,4]\wedge D[7,4]$ $Q[8]=P[6]\wedge D[0,6]\wedge D[1,5]\wedge D[3,4]\wedge D[4,4]\wedge D[5,4]\wedge D[6,2]\wedge D[7,3]$ Therefore, $Q[0]\wedge Q[1]\wedge Q[2]\wedge Q[3]\wedge Q[4]\wedge Q[5]\wedge Q[6]\wedge Q[7]\wedge Q[8]=0$, thus $Q[8]=Q[0]\wedge Q[1]\wedge Q[2]\wedge Q[3]\wedge Q[4]\wedge Q[5]\wedge Q[6]\wedge Q[7]$.

This embodiment has the advantage of providing data efficiency equal to $n/(n+2)$, which is 80% for this example (8/10=80%). In the previous embodiment, the data efficiency is equal to $n^2/(n^2+2n+1)$, which is 79% for the 8+2 example. During write operations, this embodiment provides better data efficiency, because there is no need to calculate the Q[n+1] symbol (shown as Q[8] in this example) and, thus, the processing cycles required to calculate Q[8] are saved; however, there is processor overhead required to calculate the Q[n+1] symbol (Q[8] in this example) during degraded operations (e.g., one or two storage elements have failed and data from a failed drive has been requested). In the first embodiment, additional processing cycles required to calculate the Q[n+1] symbol during degraded operations is avoided, because the Q[n+1] symbol has been previously calculated and stored during the last write operation.

For any two storage element failures, sixteen symbols in Tables 1 and 2 become unknown. Thus, for any P or Q relationship, there are one or two missing symbols. A surviving relationship has only one symbol that is unknown. Any relationship that has no unknown symbols is called an intact relationship, and relationships that have two unknowns are called non-surviving relationships. By generating symbols from surviving relationships, more non-surviving relationships are resolved-into surviving relationships. The result of the method described herein is a set of P and Q relationships that satisfies the cases where all lost symbols can be regenerated (i.e., no data is lost) for any single- and dual-storage element failures.

This method for calculating surviving relationships uses a P relationship set (example shown in Table 1) as a seed for deriving a Q relationship set (example shown in Table 2). The resulting parity symbols ensure data integrity, regardless of any combination of dual-storage element failures. The method for deriving the Q relationship set is further described below.

Figure 1:
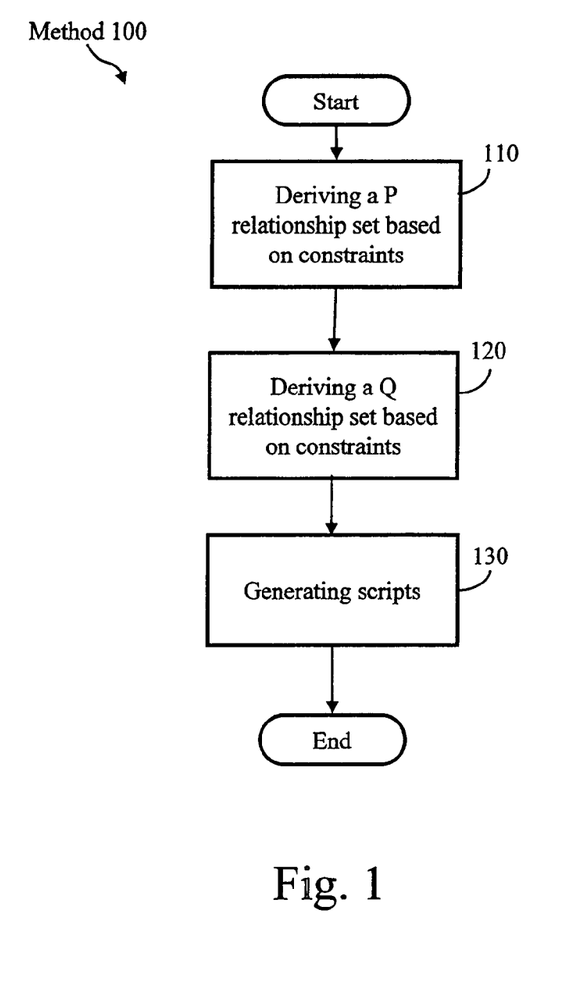
FIG. 1 is a flow diagram that illustrates a method of deriving surviving relationships in a networked storage system in accordance with an embodiment of the invention.

FIG. 1 is a method 100 of deriving a P and Q relationship set.

Step 110: Deriving a P Relationship Set Based on Constraints.

In this step, method 100 derives a P relationship from the constraints provided in the detailed example above and further summarized as follows. There are n P relationships. Each P relationship has n+1 symbols: one symbol from each storage element from a set of n+1 storage elements formed of n data storage elements and one P parity storage element. No two P relationships share the same symbol. These P relationships may be obtained manually or by the use of a simple computer program that could be easily developed by one skilled in the art. Method 100 proceeds to step 120.

Step 120: Deriving a Q Relationship Set Based on Constraints.

In this step, method 100 derives the Q relationship set from the constraints provided in the detailed example above and further summarized as follows. There are n+1 Q-relationships.

Each Q relationship has n+1 symbols: one symbol from the Q parity storage element and one symbol from each storage element, from a set of n storage elements chosen out of a set of n+1 storage elements formed of n data storage elements and one P parity storage element. No two Q relationships miss the same storage element. No two symbols in a Q relationship have a P relationship in common (every non-Q symbol is in exactly one P relationship and one Q relationship). No two Q relationships share the same symbol. Method 100 proceeds to step 130.

Step 130: Generating Scripts.

In this step, method 100 evaluates all single- and dual-storage element failure combinations. For each failure case, method 100 identifies intact, surviving, and non-surviving relationships. These relationships include both P and Q relationship sets (totaling 2n+1 relationships). Method 100 resolves missing symbols by using the surviving relationships, which in turn result in additional surviving relationships. This process continues until all missing symbols have been resolved (thus, all relationships are intact) and the XOR expression that corresponds to each resolved symbol is written to a file as a script. The ability to resolve all missing symbols for all failure cases proves that the corresponding P and Q relationship sets ensure that no data is lost. Method 100 ends. A detailed description of a method resolving the symbols of method 100 is described in FIG. 2.

Figure 2:
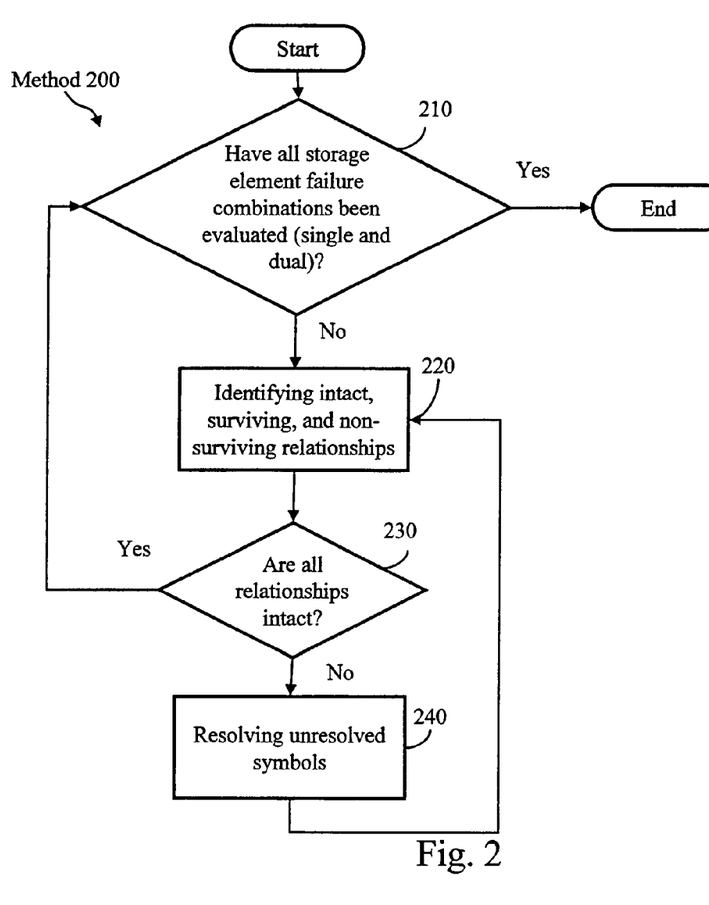
FIG. 2 is a flow diagram that illustrates a more detailed method of resolving symbols in accordance with an embodiment of the invention.

FIG. 2 is a detailed description of a method 200 of resolving the symbols described in step 130 of FIG. 1.

Step 210: Have all Storage Element Failure Combinations been Evaluated (Single and Dual)?

In this decision step, method 200 determines whether all one- or two-storage element failure combinations have been evaluated. If yes, method 200 ends; if no, initially unresolved symbols for the next storage element failure combination are identified (32 unresolved symbols are created in any two-storage element failure combinations in the 8+2 example). Method 200 proceeds to step 220.

Step 220: Identifying Intact, Surviving, and Non-Surviving Relationships.

In this step, for the given set of unresolved symbols, method 200 identifies intact relationships, surviving relationships, and non-surviving relationships. These relationships include both P and Q relationship sets (totaling 2n+1 relationships). Method 200 proceeds to step 230.

Step 230: Are all Relationships Intact?

In this decision step, method 200 determines whether all relationships are intact. If yes, method 200 returns to step 210; if no, method 200 proceeds to step 240.

Step 240: Resolving Unresolved Symbols.

In this step, method 200 expresses the unresolved symbol as an XOR equation of resolved symbols. For example, if D[1,2] in Table 2 is an unresolved symbol, it can be resolved by use of the following XOR equation:

$Q_9$: $D[1,2]=Q[6]\string^P[3]\string^D[2,0]\string^D[3,0]\string^D[4,2]\string^D[5,5]\string^D[6,6]\string^D[7,6]$ Therefore, D[1,2] is known and becomes a resolved symbol. It should be clear to one skilled in the art that this particular step illustrates a single resolution; however, multiple resolutions are possible if there are more surviving relationships. The set of unresolved symbols is updated to remove the newly resolved symbol (e.g., D[1,2] for this example). Method 200 returns to step 220. Method 200 may be performed off-line in a separate system or in real time on networked storage system resources.

Figure 3:
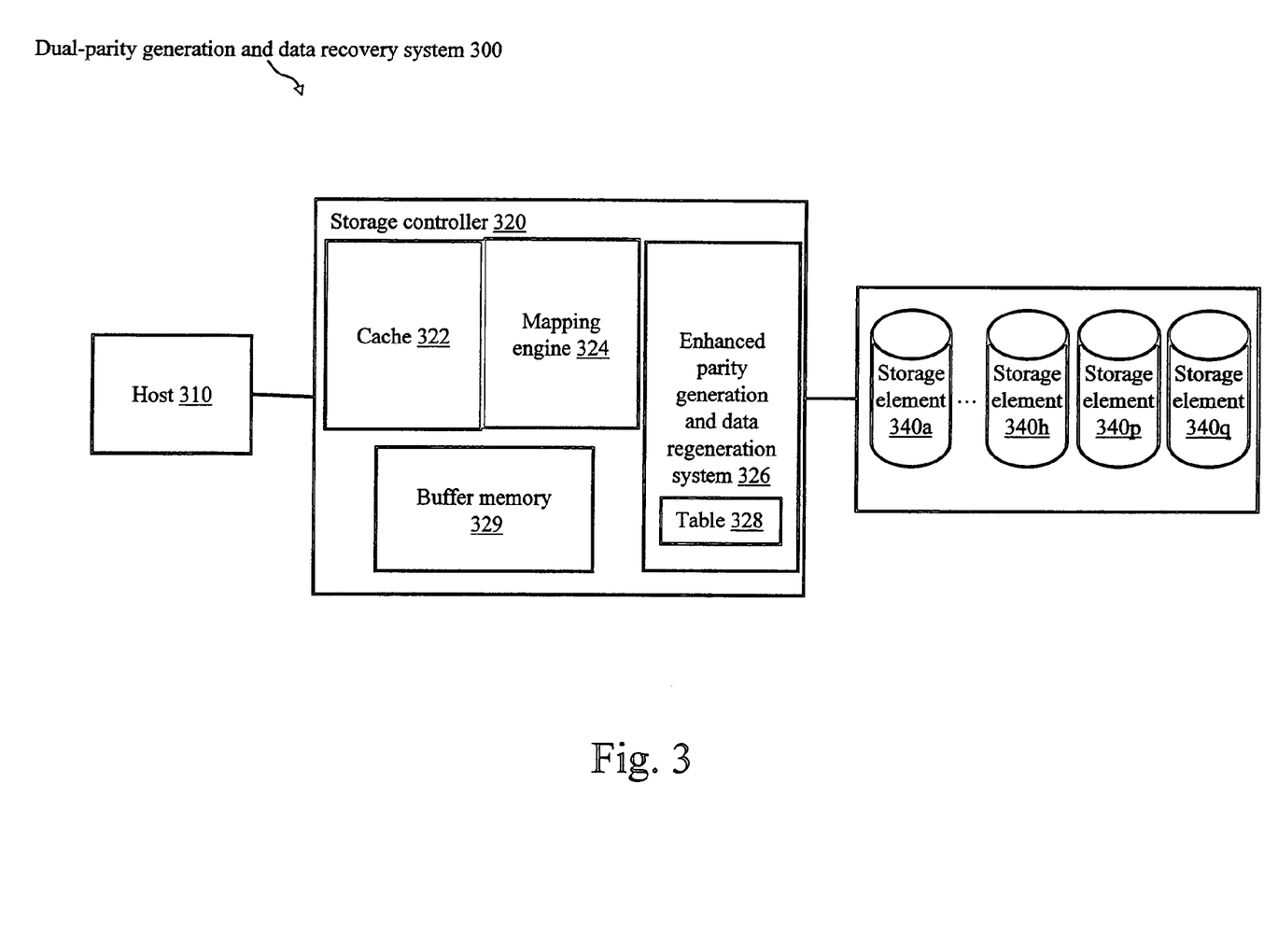
FIG. 3 illustrates a dual-parity generation and data recovery system, according to an embodiment of the invention.

FIG. 3 illustrates a dual-parity generation and data recovery system 300. System 300 includes a host 310, a storage controller 320 and a plurality of networked storage elements 340. Storage controller 320 further includes a cache 322, a mapping engine 324, an enhanced parity generation and data regeneration system 226 which also includes a table 328, and a buffer memory 329. Host 310 is representative of any kind of mechanism that requests data reads and writes to and from storage elements 340, which may be any type of networked storage system, for example, a fibre channel or SCSI. Individual storage elements 340 may be, for example, SATA or fibre channel drives. Mapping engine 324 is a transaction processor entity that translates all host 310 requests for specific volumes into the actual logical block addresses (LBAs) in storage elements 340 for storage controller 320. Storage controller 320 is an integrated I/O controller that is fully explained in U.S. application Ser. No. 10/912,157 and further includes a scalable transaction processing pipeline that is explained in U.S. application Ser. No. 10/429,048; both U.S. applications are hereby incorporated by reference.

The scripts generated by method 100 are made available as scripts in table 328. Each line of the script specifies the list of locations of the resolved symbols in buffer memory 329 that are to be XOR-ed to recover a missing symbol and the location where the recovered missing symbol (result of XORs) is to be saved. The semantics of this script language are described in U.S. Provisional Application No. 60/624,564, titled "Interpretive Language to Implement XOR-Based Algorithms," hereby incorporated by reference.

Table 328 includes a plurality of method 100 generated scripts that are initialized at power on. The number of scripts contiguously located in table 328 is representative of the number of possible storage element 340 failures. In this example, there is an 8+2 configuration (eight storage elements 340a through 340h for data and two storage elements for parity, 340p and 340q, respectively). Thus, the number of possible storage element failure combinations is $^nC_2+^nC_1$, where n is the number of storage elements, and in this case is fifty-five for this particular configuration. For a 16+2 storage element configuration, the number of possible storage element failure combinations is 163.

Each script corresponds to a particular storage element(s) 340 failure(s), including single- and dual-storage element 340 failures. For example, script one may correspond to a single failure by storage element 340a, and script fifty-five may correspond to a dual failure by storage elements 340p and 340q. These examples are provided for illustration only, and it will appreciated by one skilled in the art that the script number is arbitrarily assigned to a storage element failure or combination of failures.

In the event of single- or dual-storage element 340 failure(s), storage controller 320 determines which storage element failure case is applicable. Mapping engine 324 determines the corresponding storage element 340 LBAs (340p, 340q, and 340a-340h) for the corresponding volume and host 310 LBAs. For cases where no storage elements 340 have failed and a write operation is requested, mapping engine 324 specifies the offset (start of the relevant script) in table 328 for the script that corresponds to a dual failure by storage elements 340p and 340q, as this is the script for rebuilding the parity data stored on storage elements 340p and 340q. This script is executed by enhanced parity generation and data regeneration system 326. Each script also has an end of script command, so that script execution terminates at the end of the correct script and before the beginning of the next contiguous script.

In a write operation, host 310 generates a write request to storage controller 320. Cache 322 stores the write request and write data. Cache 322 sends a request to mapping engine 324 to flush the relevant data in buffer memory 329 to storage elements 340. Mapping engine 324 determines that storage elements 340p and 340q need to be updated, as a result of the write operation. Mapping engine 324 specifies the script (table 328 offset) that needs to be executed by enhanced parity generation and data regeneration system 326 for generating the updated 340p and 340q parity data. Enhanced parity generation and data regeneration system 326 executes the commands for the specified script in table 328, until the end of the script is reached. The result is updated P parity and Q parity symbols in buffer memory 329. Storage controller 320 flushes the updated P and Q parity to storage elements 340p and 340q, respectively. Host 310 data is also flushed from buffer memory 329 to the corresponding storage elements 340a-340h. Finally, storage controller 320 sends a "done" signal to host 310, which completes the write operation.

In a missing data read operation caused by failed storage elements (for this example, storage elements 340c and 340f have failed), cache 322 determines that the host command is a cache miss. Cache 322 issues a read request to mapping engine 324. Mapping engine 324 determines which storage elements 340 corresponding LBA ranges need to be read to satisfy the host 310 command and also allocates space in buffer memory 329 for holding parity and other data needed for regenerating missing data. Mapping engine 324 then issues read commands to the storage element 340 controllers (not shown) to read the relevant data from remaining functional storage elements 340, including storage elements 340p and 340q, into buffer memory 329. Mapping engine 324 translates the storage elements 340c and 340f failures to a corresponding table 328 script and passes the script offset and location of data and parity (read from storage element 340) in buffer memory 329 to enhanced parity generation and data regeneration system 326. Enhanced parity and data regeneration system 326 executes the script in table 328 (mapping engine 324 specifies an offset location in table 328, which is the start of the script). Enhanced parity and data regeneration system 326 regenerates the missing data for storage elements 340c and 340f from the remaining data (relevant data from functional storage elements 340, including 340p and 340q) in buffer memory 329 and stores the regenerated data in buffer memory 329. Storage controller 320 sends the requested data, including the reconstructed data, to host 310 from buffer memory 329.

The above description and drawings should only be considered illustrative of exemplary embodiments that achieve the features and advantages of the invention. Modification and substitutions to specific process conditions and structures can be made without departing from the spirit and scope of the invention. Accordingly, the invention is not to be considered as being limited by the foregoing description and drawings, but is only limited by the scope of the appended claims.

The invention claimed is:

1. A method of calculating single and dual parity for a networked array of storage elements, the method comprising:

deriving a first set of n relationships, each of the first set of n relationships consisting of an XOR statement equaling zero, containing n data symbols from n storage elements and one parity symbol from a first set of parity symbols;

deriving a second set of n+1 relationships, each of the second set of n+1 relationships consisting of an XOR statement equaling zero, containing at least n−1 data symbols from at least n−1 storage elements and one parity symbol from a second set of parity symbols; and generating scripts that use the first and second sets of relationships to resolve unresolved symbols resulting from possible single- and dual-storage element failure combinations.

2. The method of claim 1, wherein each of the relationships in the first set of relationships contains one symbol from each of the n storage elements.

3. The method of claim 1, wherein each symbol from the n storage elements and the first set of parity symbols is contained by no more than one relationship in the first set of relationships.

4. The method of claim 1, wherein each relationship in the second set of relationships contains n symbols from the n storage elements and the first set of parity symbols.

5. The method of claim 1, wherein each symbol from the n storage elements and the sets of first and second parity symbols is contained by no more than one relationship in the second set of relationships.

6. The method of claim 1, wherein symbols together in a relationship of the first set of relationships are not together in a relationship of the second set of relationships.

7. The method of claim 1, wherein no two relationships in the second set of relationships exclude the same storage element.

8. The method of claim 1, wherein each symbol is one of the group consisting of an arbitrary number of bytes, a word, a portion of a sector, and a block of sectors.

9. The method of claim 1, wherein generating scripts further comprises:
    evaluating single- and dual-storage element failure combinations;
    identifying intact, surviving and non-surviving relationships that correspond to the evaluated failure combinations; and
    resolving unresolved symbols using the intact, surviving and non-surviving relationships.

10. The method of claim 1, wherein the step of generating scripts occurs off line in advance of a single- or dual-storage element failure in the networked array of storage elements.

11. The method of claim 1, wherein one relationship of the second set of n+1 relationships is derived directly from the other n relationships in the second set of n+1 relationships.

12. A method of calculating single and dual parity for a networked array of storage elements, the method comprising:
    partitioning a set of n data storage elements in the array into n partitions;
    partitioning a first parity storage element in the array into n partitions;
    partitioning a second parity storage element in the array into n+1 partitions;
    deriving a first set of n relationships, each of the relationships of the first set of relationships consisting of an XOR statement containing n+1 elements for storing symbols from the set of n data storage elements and the first parity storage element;
    deriving a second set of n+1 relationships, each of the relationships of the second set of relationships consisting of an XOR statement containing n+1 elements for storing symbols from the set of n data storage elements and the first and second parity storage elements; and
    generating scripts to resolve unresolved symbols resulting from possible single- and dual-storage element failure combinations, the scripts using the first and second sets of relationships.

13. The method of claim 12, wherein each relationship in the first set of relationships contains one symbol from each of the n data storage elements.

14. The method of claim 12, wherein each symbol from the n data storage elements and the first parity storage element is contained by no more than one relationship of the first set of relationships.

15. The method of claim 12, wherein each relationship of the second set of relationships contains n symbols from the n data storage elements and the first parity storage element.

16. The method of claim 12, wherein each symbol from the n data storage elements and the first and second parity storage elements is contained by no more than one relationship in the second set of relationships.

17. The method of claim 12, wherein symbols together in a relationship of the first set of relationships are not together in a relationship of the second set of relationships.

18. The method of claim 12, wherein no two relationships in the second set of relationships exclude the same storage element.

19. The method of claim 12, wherein each symbol is one of the group consisting of an arbitrary number of bytes, a word, a portion of a sector, and a block of sectors.

20. The method of claim 12, wherein generating scripts further comprises:
    evaluating single- and dual-storage element failure combinations;
    identifying intact, surviving and non-surviving relationships that correspond to the evaluated failure combinations; and
    resolving unresolved symbols using the intact, surviving and non-surviving relationships.

21. The method of claim 12, wherein the step of generating scripts occurs off line in advance of a single- or dual-storage element failure in the networked array of storage elements.

22. The method of claim 12, wherein one relationship of the second set of n+1 relationships is derived directly from the other n relationships in the second set of n+1 relationships.

23. A system for calculating single and dual parity for a networked array of storage elements, the system comprising:
    a set of n networked data storage elements, each of the n data storage elements partitioned into n partitions, each partition configured to store a symbol;
    a first parity storage element partitioned into n partitions and networked with the set of n data storage elements, each partition configured to store a symbol;
    a second parity storage element partitioned into n+1 partitions and networked with the set of n data storage elements and the first parity storage element, each partition configured to store a symbol; and
    a storage controller comprising a parity generation and data regeneration module, said module configured to access and run scripts to resolve unresolved symbols resulting from possible single- and dual-storage element failure combinations, the scripts using a first and a second set of relationships, wherein each relationship of the first set of relationships consists of n data symbols from the n data storage elements and one parity symbol from the first parity storage element, each of the first set of relationships consisting of an XOR statement equaling zero, and wherein each relationship of the second set of relationships consists of at least n-i data symbols from at least n−1 storage elements and one parity symbol from the second parity storage element, each of the second set of relationships consisting of an XOR statement equaling zero.

24. The system of claim 23, wherein each relationship of the first set relationships contains one symbol from each of the n data storage elements.

25. The system of claim 23, wherein each symbol from the n data storage elements and the first parity storage element is contained by no more than one relationship of the first set of relationships.

26. The system of claim 23, wherein each relationship of the second set of relationships contains n symbols from the n data storage elements and the first parity storage element.

27. The system of claim 23, wherein each symbol from the n data storage elements and the first and second parity storage elements is contained by no more than one relationship in the second set of relationships.

28. The system of claim 23, wherein symbols together in a relationship of the first set of relationships are not together in a relationship of the second set of relationships.

29. The system of claim 23, wherein no two relationships in the second set of relationships exclude the same storage element.

30. The system of claim 23, wherein each symbol is one of the group consisting of an arbitrary number of bytes, a word, a portion of a sector, and a block of sectors.

31. The system of claim 23, wherein the scripts further comprise:
 an evaluation of single- and dual-storage element failure combinations;
 instructions to identify intact, surviving and non-surviving relationships that correspond to the evaluated failure combinations; and
 commands to resolve unresolved symbols using the intact, surviving and non-surviving relationships.

32. The system of claim 23, wherein the scripts are generated off line in advance of a single- or dual-storage element failure in the networked array of storage elements.

* * * * *